US007992277B2

(12) United States Patent
Cao

(10) Patent No.: US 7,992,277 B2
(45) Date of Patent: Aug. 9, 2011

(54) SUSPENSION DAMPER REMOVAL TOOL

(75) Inventor: Michael Cao, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 1242 days.

(21) Appl. No.: 11/623,223

(22) Filed: Jan. 15, 2007

(65) Prior Publication Data

US 2008/0168641 A1 Jul. 17, 2008

(51) Int. Cl.
*B23P 19/00* (2006.01)

(52) U.S. Cl. ...................................................... 29/426.5

(58) Field of Classification Search ................. 29/426.1, 29/426.4, 426.5, 426.6, 566, 270, 281.5; 81/484

See application file for complete search history.

(56) References Cited

U.S. PATENT DOCUMENTS 2,262,969 A 11/1941 Schultz
3,935,760 A 2/1976 Taylor
4,061,308 A 12/1977 Ghent
4,117,709 A * 10/1978 Jackson .......................... 72/386
4,346,518 A 8/1982 Wood
4,424,697 A * 1/1984 Carver ............................ 72/309
4,522,090 A 6/1985 Kittle
4,570,514 A 2/1986 Schoener
4,571,809 A 2/1986 Rossow
4,620,360 A 11/1986 Morris
4,989,481 A 2/1991 Grimes
6,145,179 A 11/2000 Smith et al.
6,442,817 B1 9/2002 Swanson
6,454,252 B2 9/2002 Miyamoto
2006/0220338 A1 10/2006 Orimoto et al.

* cited by examiner

*Primary Examiner* — John C Hong

(74) *Attorney, Agent, or Firm* — Mark E. Duell; Rankin Hill & Clark LLP

(57) ABSTRACT

The present disclosure relates to a suspension damper removal tool for removing a shock absorber from a suspension assembly of a vehicle. The removal tool includes a base and a projection. The base includes a first end portion and a second end portion. The first end portion has at least one mounting hole for mounting the removal tool to at least one lug bolt of a hub assembly. The projection extends outwardly from the second end portion of the base.

3 Claims, 4 Drawing Sheets

SUSPENSION DAMPER REMOVAL TOOL

BACKGROUND

The present disclose generally relates to motor vehicle suspensions. More particularly, the present disclosure relates to a suspension damper removal tool for removing a damper or shock absorber from a motor vehicle.

Shock absorbers have long been used for automotive and other types of vehicles to absorb shock imparted to the vehicle's wheels by the road surface and dampen oscillation of springs associated with the wheel mounting assembly. Typically, a shock absorber includes a cylindrical shock body, a shock stem extending outwardly from a piston mounted in the cylinder, and attachment devices for securing the shock stem and the shock body between the wheel assembly and the chassis of the vehicle. The end of the shock body opposite the shock stem is generally attached to a lower mounting bracket that supports the wheel. The opposite end of the shock absorber, defined by the end of the shock stem, is generally secured to an upper mounting bracket, which is rigidly attached to the chassis or frame of the vehicle.

Like all mechanical devices, shock absorbers wear and deteriorate through use. Removal of shock absorbers from vehicles is a problem of long standing. In many applications, operative attachment of shock absorbers to certain motor vehicles, particularly the position of the shock absorbers in relation to the suspension and axle, makes removal of the shock absorber difficult. The arrangement of shock absorbers in the suspension of various vehicles restricts access to the shock absorbers with conventional tools. The use of conventional tools, such as wrenches, nut crackers, ratchet tools, hammers and pry bars, to remove the shock absorbers is often difficult and time consuming, if not impossible, particularly in instances where a combination of these tools are required. For example, shock absorbers for double wishbone type suspensions are frequently difficult to remove due to a limited working area. Generally, a pry bar can be used to lower a lower control arm of the double wishbone suspension so that the shock absorber can be released from a lower mount and then removed. This can be a difficult process because some lower control arms include relatively stiff bushings thereby requiring a long moment arm. This can also be a dangerous process if the pry bar was to slip and move in an undesired manner or break and bend. Also, in certain vehicles, a brake line and/or fuel line may become pinched which can cause a leak.

Accordingly, it is desired to provide an apparatus for removing shock absorbers in a safe, timely and cost efficient manner.

BRIEF DESCRIPTION

In accordance with one aspect, a suspension damper removal tool for removing a shock absorber from a suspension assembly of a vehicle comprises a base and a projection. The base includes a first end portion and a second end portion. The first end portion has at least one mounting hole for mounting the removal tool to at least one lug bolt of a hub assembly. The projection extends outwardly from the second end portion of the base.

In accordance with another aspect, a method of removing a shock absorber of a motor vehicle circumferentially surrounded by a coil spring is provided via a removal device. The shock absorber has a first end attached to a body of the motor vehicle and a second end attached to a suspension assembly. The removal device includes first and second ends. The first end has at least one mounting hole. The second end has an outwardly extending projection. The removal device is mounted onto a hub assembly of the motor vehicle. The second end of the shock absorber is released from the suspension assembly via the removal device. The first end of the shock absorber is released from the motor vehicle body.

In accordance with yet another aspect, a suspension damper removal tool for removing a shock absorber from a suspension assembly comprises a plate and a moment arm. The plate has a plurality of spaced apart through holes defining at least one mounting pattern for mounting the removal tool to lug bolts of a hub assembly. The moment arm is fixedly secured to the plate. The moment arm is configured to receive a downwardly directed force and to apply this force via the plate, when mounted to the lug bolts of the hub assembly, to move a lower portion of the suspension assembly downward, which, in turn, allows for the removal of the shock absorber from the suspension assembly.

DETAILED DESCRIPTION

Figure 1:
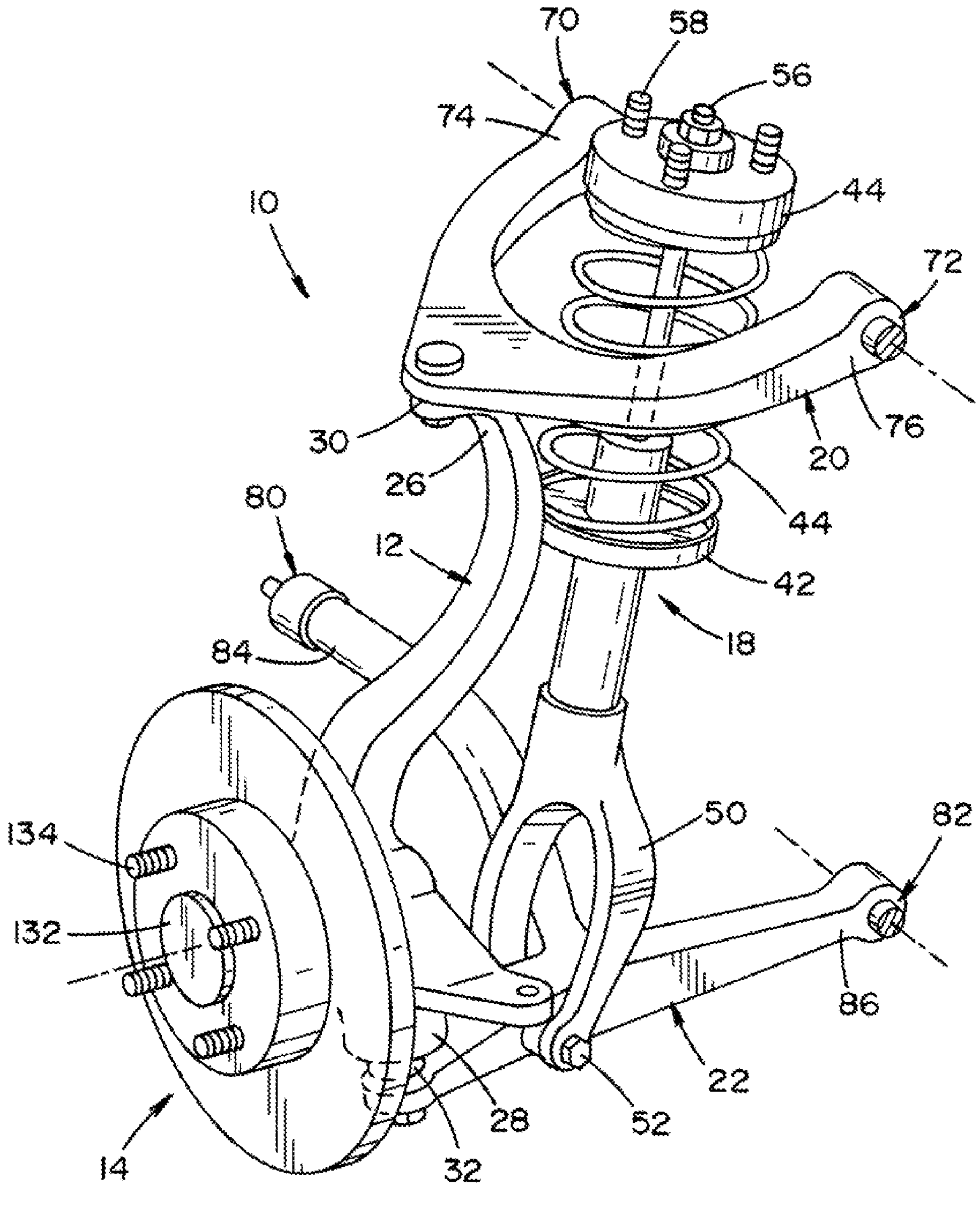
FIG. 1 is a perspective view of a conventional double-wishbone type suspension including a hub assembly.

It should, of course, be understood that the description and drawings herein are merely illustrative and that various modifications and changes can be made in the structures disclosed without departing from the scope and spirit of the present disclosure. All references to direction and position, unless otherwise indicated, refer to the orientation of the suspension damper removal tool illustrated in the drawings and should not be construed as limiting the claims appended hereto. It will also be appreciated that, while the illustrated embodiment of the suspension damper removal tool is particularly adapted for use with an automobile having a double wishbone type suspension, it should be understood that the present disclosure can be utilized with other suspension assemblies.

Figure 2:
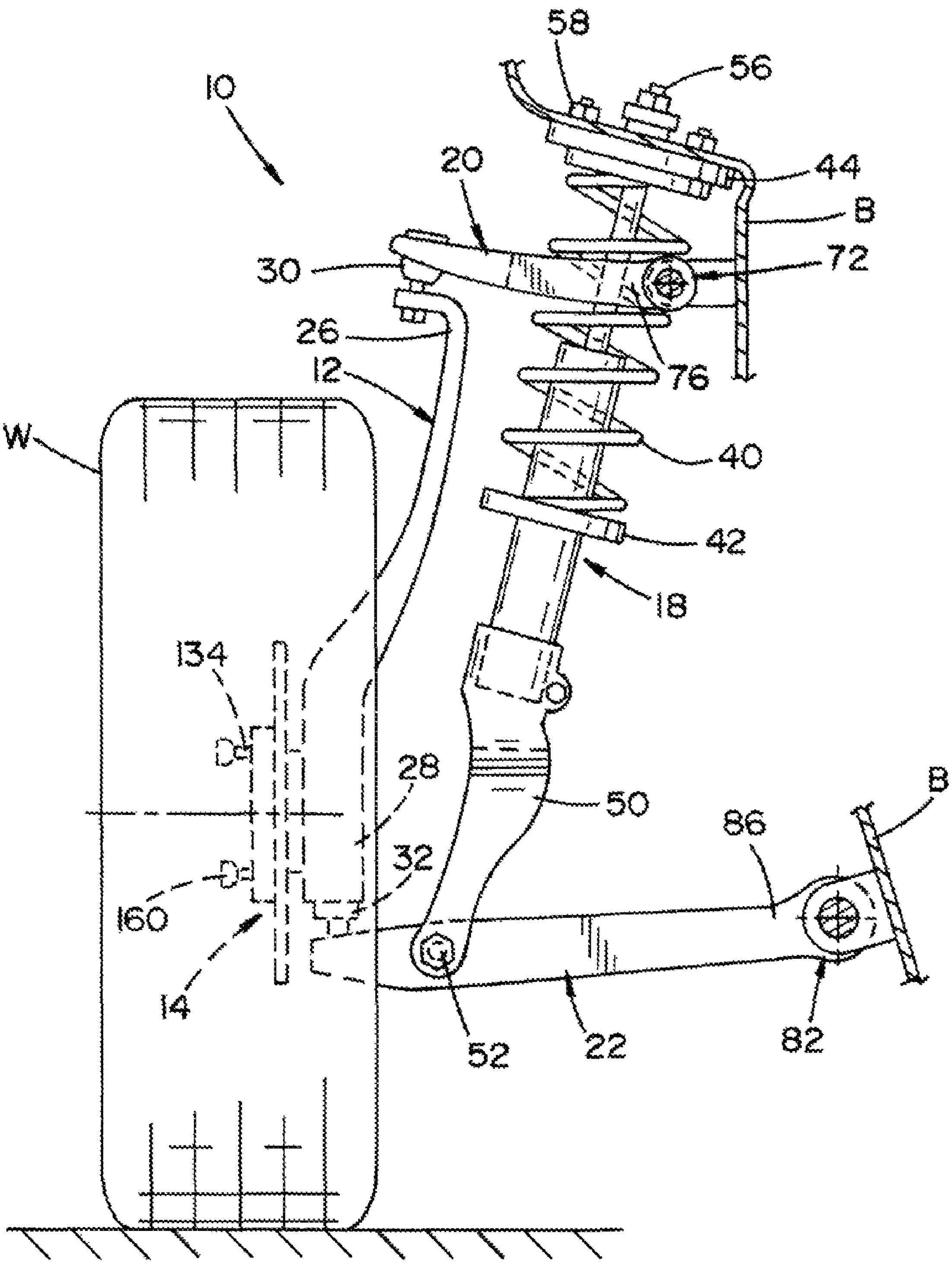
FIG. 2 is a side elevational view of the double-wishbone assembly of FIG. 1 operably connected to a tire and a vehicle frame.
Figure 3:
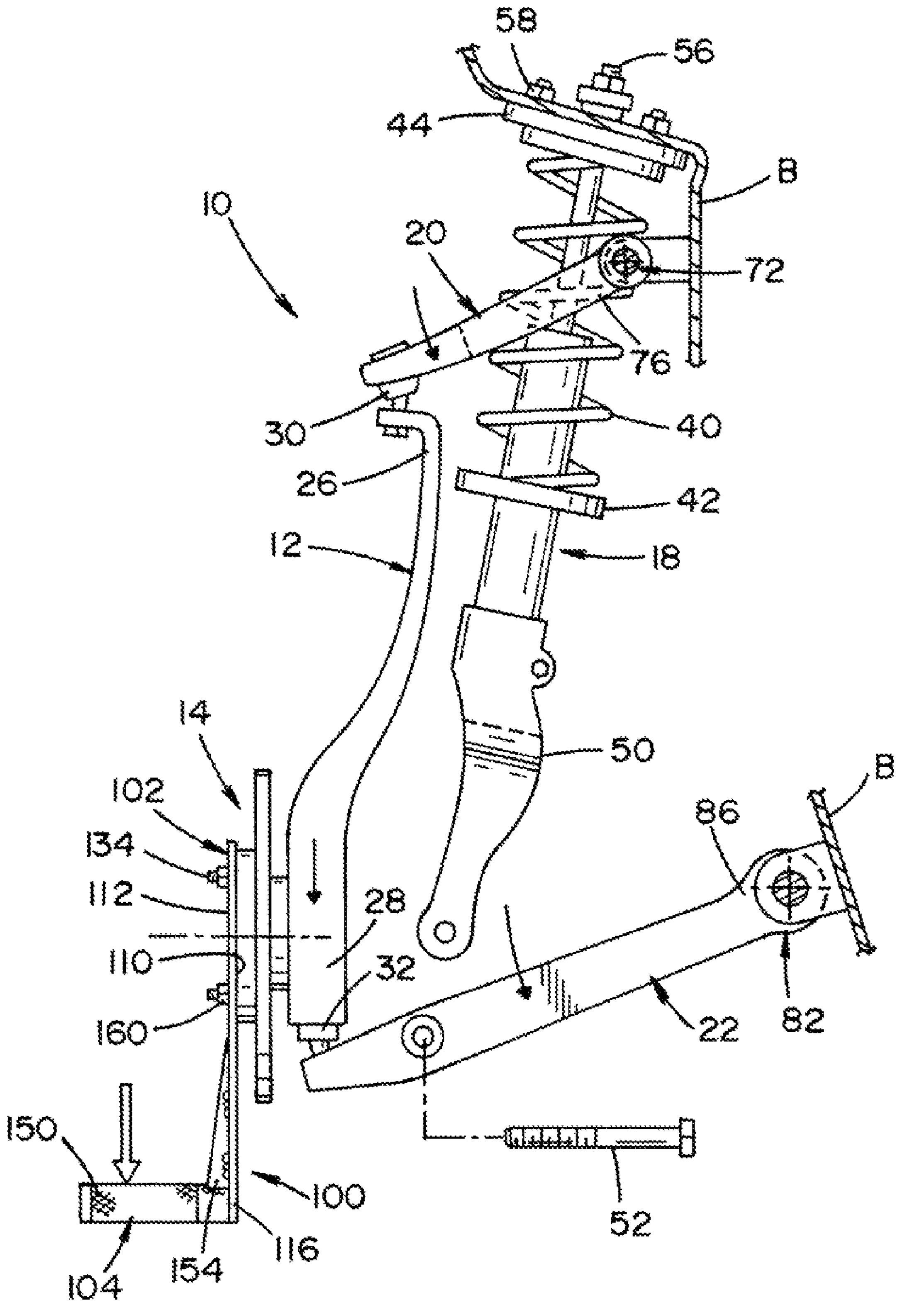
FIG. 3 is a side elevational view of the double-wishbone type suspension and hub assembly of FIG. 1 including a damper removal tool according to the present disclosure, the damper removal tool being mounted to the hub assembly, a downward force being applied to the damper removal tool for the removal of a damper.

Referring now to the drawings, wherein like numerals refer to like parts throughout the several views, FIGS. 1-3 illustrate a conventional double-wishbone type suspension 10, which generally include a steering knuckle 12 for rotatably supporting a conventional hub assembly 14 and a wheel W mounted thereon; a damper or shock absorber 18 for damping the vertical movement of the knuckle; an upper control arm 20; and a generally L-shaped lower control arm 22. The upper arm and lower arm are both coupled to respective upper end and lower end portions 26 and 28, respectively, of the steering knuckle via upper and lower bushings 30 and 32, respectively.

The shock absorber 18 is vertically and circumferentially enclosed within a coil spring 40 for cushioning vertical movement of the knuckle. A lower end of the coil spring is supported on a lower spring seat 42, and the upper end thereof is supported on an upper spring seat 44. A lower end portion 50 of the shock absorber 18 is supported by a fastener, such as a lower shock bolt 52, on the lower control arm 22. This retains the lower end portion 50 in a generally fixed mounting position. The upper end portion 56 of the shock absorber is typically connected to a vehicle body B via an upper shock bracket (not shown) which is fastened to the upper spring seat via bolts 58.

As shown in FIGS. 1 and 2, upper rubber bushings 70, 72, which can be vibration isolating rubber members, are mounted on end portions 74, 76 of the upper control arm 20. Lower rubber bushings 80, 82, which also can be vibration isolating rubber members, are mounted on end portions 84, 86 of the lower control arm 22. The upper and lower bushings are connected to the vehicle body B and elastically support the upper and lower control arms 20, 22 in such a manner as to be displaced in longitudinal, vertical and transverse directions.

Further details of the double wishbone type suspension 10 and hub assembly 14 are generally conventional and generally understood by one skilled in the art so that further discussion herein is deemed unnecessary.

Figure 4:
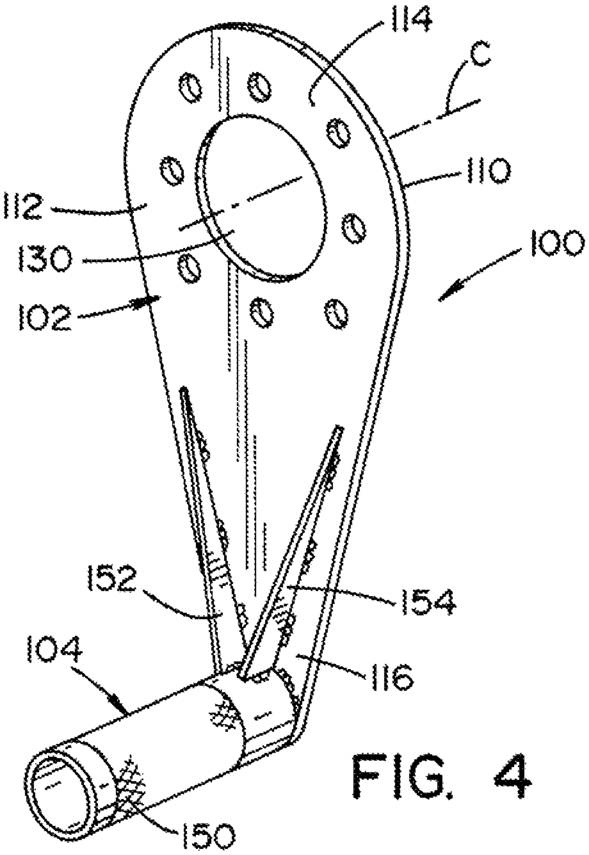
FIG. 4 is a perspective view of the damper removal tool of FIG. 3.
Figure 5:
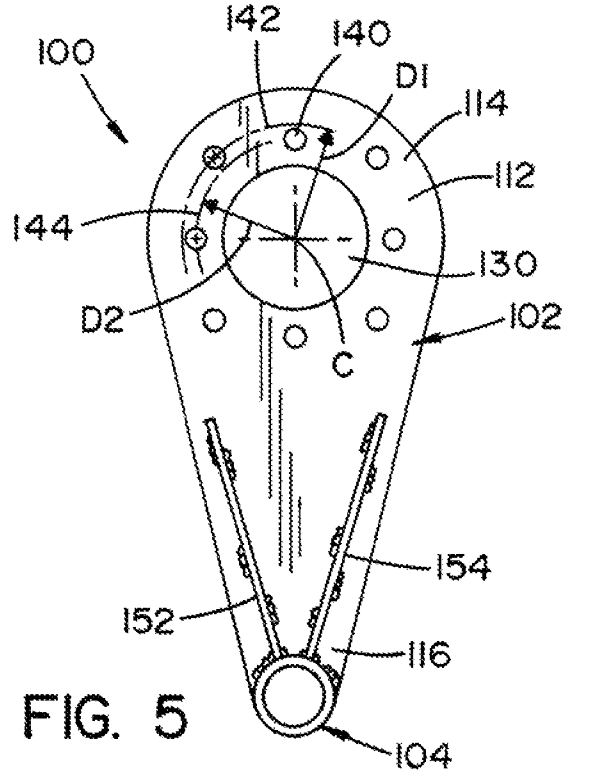
FIG. 5 is a front elevational view of the damper removal tool of FIG. 4.
Figure 6:
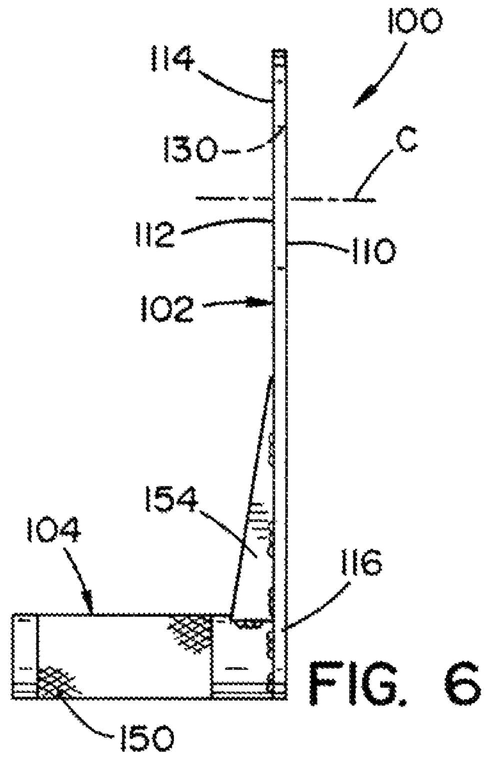
FIG. 6 is a side elevational view of the damper removal tool of FIG. 4.

With additional reference to FIGS. 4-6, a suspension damper removal tool 100 for removing the damper or shock absorber 18 from the double wishbone type suspension 10 is illustrated. The removal tool includes a base or plate 102 and a moment arm or projection 104 connected, preferably fixedly secured (for example, by welding), to the base. The base is generally triangular in shape; although, alternate shapes are also contemplated. The projection is generally cylindrical in shape; although, alternate shapes are also contemplated.

The base includes first and second opposed surfaces 110 and 112, respectively, and first and second end portions 114 and 116, respectively. As shown in FIG. 3, the first end portion 114 is configured to be mounted to the hub assembly 14. The first surface 110 is generally planar which allows the first surface to lie generally flush against the hub assembly 14 upon mounting the removal tool 10 to the hub assembly.

With reference to FIGS. 4 and 5, the first end portion 114 includes an opening 130 sized to receive a conventional center projection 132 of the hub assembly 14. The first end portion 114 further includes at least one mounting hole defining at least one mounting pattern, the at least one mounting hole sized to receive at least one conventional lug bolt 134 (FIG. 3) of the hub assembly 14. In the illustrated embodiment, a plurality of spaced apart mounting holes 140 is provided defining at least two mounting patterns. A first mounting pattern 142 is radially spaced a first distance D1 from a center C of the opening 130 for mounting to a first set of lug bolts having a first bolt spacing. A second mounting pattern 144 is radially spaced a second distance D2 from the center of the opening for mounting to a second set of lug bolts having a second bolt spacing. It should be appreciated that only one or more than two mounting patterns can be provided, as well as alternate mounting patterns than those illustrated, thereby allowing the damper removal tool 100 to be secured to hub assemblies having differing numbers of lug bolts and bolt spacings.

The projection 104 extends substantially perpendicularly from the second surface 112 near the second end portion 116. The projection can include raised features, surface treatment or the like (for example, a knurled surface 150) located around a portion of a circumference of the projection to provide a non-slip surface. The removal tool 100 further includes at least one strengthening member or gusset secured to and extending between the projection and the base. In the depicted embodiment, first and second generally triangular gussets 152 and 154, respectively, each have a first side secured to the projection and a second side secured to said base. The gussets add further strength and stability to the damper removal tool 100. The gussets further provide additional stability against vertical deflecting forces and maintain the generally perpendicular relationship between the base 102 and the projection 104.

In use, and with reference to FIG. 3, the removal tool 100 is mounted to the hub assembly 14 by positioning the removal tool onto the lug bolts 134 of the hub assembly 14. The tool is then secured to the hub assembly via conventional lug nuts 160. The suspension damper mounting bolt 52 is removed such that a lower end of the damper is releasably positioned over the lower control arm 22. The upper end of the damper is released from the vehicle body (via removal of bolts 56 and 58). A vertical force is then applied to the moment arm 104, which, in turn, causes the suspension assembly 10, and particularly the lower control arm 22, to move downwardly. As the lower control arm moves downward, a space is created between the lower end of the damper and the lower control arm. The damper is now able to move downward and be removed from the suspension assembly.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of removing a shock absorber of a motor vehicle, the shock absorber being circumferentially surrounded by a coil spring, the shock absorber having a first end attached to a body of the motor vehicle and a second end attached to a suspension assembly, comprising the steps of:

providing a removal device including first and second ends, said first end having at least one mounting hole, said second end having an outwardly extending projection;

mounting said removal device onto a hub assembly of the motor vehicle;

releasing the second end of the shock absorber from the suspension assembly with said removal device by applying a downward force on said projection to move an associated lower portion of the suspension assembly downward; and releasing the first end of the shock absorber from the vehicle body.

2. The method according to claim 1, wherein said step of mounting said removal device includes the step of inserting at least one lug bolt of the hub assembly through said at least one mounting hole.

3. The method according to claim 2, wherein said step of mounting said removal device includes the step of bolting said removal tool to said hub assembly via at least one lug nut of the hub assembly.

* * * * *